(12) United States Patent
Kern et al.

(10) Patent No.: US 8,385,341 B2
(45) Date of Patent: Feb. 26, 2013

(54) ETHERNET FRAME BROADCAST EMULATION

(75) Inventors: András Kern, Budapest (HU); Attila Takács, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 221 days.

(21) Appl. No.: 13/122,508

(22) PCT Filed: Oct. 2, 2008

(86) PCT No.: PCT/EP2008/063263
§ 371 (c)(1), (2), (4) Date: Apr. 4, 2011

(87) PCT Pub. No.: WO2010/037421
PCT Pub. Date: Apr. 8, 2010

(65) Prior Publication Data
US 2011/0188509 A1    Aug. 4, 2011

(51) Int. Cl.
*H04L 12/28* (2006.01)
(52) U.S. Cl. ......................... 370/390; 370/401
(58) Field of Classification Search .................. 370/389, 370/390, 392, 400, 401, 408
See application file for complete search history.

(56) References Cited

U.S. PATENT DOCUMENTS

| | | | |
|---|---|---|---|
| 7,061,911 B2 * | 6/2006 | Furuno | 370/392 |
| 7,177,921 B2 * | 2/2007 | Taguchi | 709/220 |
| 7,203,762 B2 * | 4/2007 | Yamada et al. | 709/238 |
| 7,720,003 B2 * | 5/2010 | Benjamin et al. | 370/254 |
| 7,911,980 B1 * | 3/2011 | Smiljanic | 370/256 |
| 2003/0189927 A1 * | 10/2003 | Foster et al. | 370/389 |
| 2005/0769270 | 8/2005 | Mutou et al. | |
| 2005/0201273 A1 * | 9/2005 | Shimizu | 370/216 |
| 2008/0075016 A1 * | 3/2008 | Ashwood-Smith | 370/252 |

* cited by examiner

*Primary Examiner* — Hong Cho
(74) *Attorney, Agent, or Firm* — Roger S. Burleigh

(57) ABSTRACT

A method to facilitate the broadcast of frames between a set of Edge Nodes of a transport network, where nodes of the transport network forward frames using labels added to the frames at ingress Edge Nodes. The method comprises, at each of said Edge nodes and at intermediate nodes in the paths between said Edge Nodes, installing an entry or entries into a forwarding table mapping frame labels to output forwarding ports such that said entries together form a single forwarding construct such that frames labelled by any of the Edge Nodes of said set are transmitted to all other Edge Nodes of the same set. Upon receipt of a frame at one of said Edge Nodes or intermediate nodes, the provided forwarding table is used to map the frame label of the frame to one or more forwarding ports. Frames are then sent via the identified forwarding port(s).

12 Claims, 7 Drawing Sheets

ETHERNET FRAME BROADCAST EMULATION

TECHNICAL FIELD

The present invention relates to the emulation of Ethernet frame broadcasting across a provider's transport network to which Ethernet Local Area Networks (LANs) are connected. The invention is applicable in particular, though not necessarily, to Ethernet frame broadcast emulation across a transport network employing the Multi Protocol Label Switching or Provider Backbone Bridging Traffic Engineering mechanism.

BACKGROUND

The Ethernet LAN Service defined by the Metro Ethernet Forum (MEF) is likely to become an important Layer 2 Virtual Private Network service, being capable of securely interconnecting selected Ethernet LANs via one or more provider transport networks. The service must emulate the legacy Ethernet LAN operation from the point of view of a customer of a transport network operator. Therefore, both unicast and broadcast forwarding of the client Ethernet frames must be supported across the transport network(s).

FIG. 1 illustrates schematically an example provider's transport network comprising a multiplicity of Provider Edge (PE) nodes and internal P routers, interconnected by trunks (e.g. optical fibres) of the transport network. A plurality of corporate Ethernet LANs are connected to the transport network via respective Customer Edge (CE) nodes that are in turn connected to corresponding PE nodes. The Virtual Private LAN Service (VPLS) [1] is an Ethernet LAN service provided over IP/MPLS-based networks and applies the Pseudo-wire End-to-End (PWE) architecture. Full mesh connectivity between the provider edge nodes (PE) is established with point-to-point connections. PE nodes implement a virtual bridge emulating the MAC learning functionality. However, until a PE has received a frame from a given MAC address, it does not know over which port that particular address is reachable. Therefore, if a PE receives an Ethernet frame with a previously unseen destination address, it will send the frame to all other PEs within the appropriate customer service set (i.e. to those PEs connected to Ethernet LANs belonging to the same Wide Area Network (WAN) as the LAN from which the frame originates).

According to VPLS, the ingress PE replicates the frame and sends one copy to each remote PEs over point-to-point pseudo-wires. In order to decrease the bandwidth consumed by this ingress based frame replication, a set of multicast trees can be deployed in addition to the full mesh point-to-point connectivity as described in [2]. Consider for example a given customer WAN comprising four Ethernet LANs, with each LAN being coupled to a CE and in turn to a PE. A multicast tree is established for each of the four PEs (by appropriately configuring forwarding tables in the PEs and the intervening routers), such that a frame received at an ingress PE is forwarded up the tree towards the three other PEs. Branching of frames occurs at intervening routers. Nonetheless, duplication of frame sending is significantly reduced. Currently RSVP-TE supports the establishment of point-to-point [6], point-to-multipoint [7], and multipoint-to-point [8] connections over MPLS.

Ethernet standards are being amended to equip Ethernet with new features in support of Carrier Ethernet capabilities. Provider Bridging (PB) [3] and Provider Backbone Bridging (PBB) [4] are enhancing Ethernet scalability, and may even replace MPLS in future transport networks. With PB, a new VLAN tag, Service VLAN (S-VLAN), is introduced to allow providers to use a separate VLAN space while transparently maintaining the customer VLAN (C-VLAN) information. PBB allows for full separation of the customer and provider address spaces by encapsulating customer frames with the addition of a "backbone" MAC header. This allows both the MAC addresses and the whole VLAN space to be under the control of the provider. PBB-TE [5] decouples the Ethernet data and control planes by explicitly supporting external control/management mechanisms to configure static filtering entries in bridges and create explicitly routed connections.

Generalized Multi-protocol Label Switching (GMPLS) is a candidate control plane for PBB-TE and indeed the IETF is currently specifying GMPLS extensions for PBB-TE. GMPLS is a general control plane architecture for different Layer 1 and Layer 2 forwarding technologies. GMPLS uses specific protocols to support the dissemination of the data plane parameters (routing protocols with Traffic Engineering extension: OSPF-TE/ISIS-TE) and the establishment of connections between nodes (signaling protocols: RSVP-TE). As with MPLS, RSVP-TE will allow the establishment of multicast trees within the PBB-TE based transport network to facilitate Ethernet frame broadcast simulation.

Whether in MPLS or PBB-TE based transport networks, simulating Ethernet frame broadcasting using a set of multicast trees is an expensive function to manage. For example, for a WAN involving twenty PE nodes, as well as point-to-point connections between each and every PE, twenty multicast trees are required.

SUMMARY

It is an object of the present invention to overcome or at least mitigate the disadvantages noted in the preceding paragraph. It is proposed here to enable broadcast functionality between a set of Edge Nodes of a transport network by employing a single forwarding construct or "broadcast tree", rather than by employing a set of multicast trees.

According to a first aspect of the present invention there is provided a method to facilitate the broadcast of frames between a set of Edge Nodes of a transport network, where nodes of the transport network forward frames using labels added to the frames at ingress Edge Nodes. The method comprises, at each of said Edge nodes and at intermediate nodes in the paths between said Edge Nodes, installing an entry or entries into a forwarding table mapping frame labels to output forwarding ports such that said entries together form a single forwarding construct such that frames labelled by any of the Edge Nodes of said set are transmitted to all other Edge Nodes of the same set. Upon receipt of a frame at one of said Edge Nodes or intermediate nodes, the provided forwarding table is used to map the frame label of the frame to one or more forwarding ports. Frames are then sent via the identified forwarding port(s).

The forwarding construct may be defined for PBB-TE, in which case said entry in a forwarding table contains the identities of all ports of a node that transport frames to the Edge Nodes of the forwarding construct. The method comprises installing a single forwarding entry mapping a Backbone MAC address and Backbone VLAN identifier to the identities of all output ports in the forwarding paths between Edge Nodes and Intermediate nodes.

In the case of MPLS, the forwarding construct is implemented as a set of entries in the Incoming Label Mapping table and the Next Hop Label Forwarding Entry table of each node, with one entry being defined in each table for each port of the node transporting frames to the Edge Nodes of the forwarding construct, and each entry containing the identities of all ports of the node that transport frames to the Edge Nodes of the forwarding construct except the port to which the entry is assigned.

One of said Edge Nodes may be designated to manage the forwarding construct utilising the RSVP-TE signalling protocol, i.e. acting as a Master Control Node. The Master Control Node uses the RSVP-TE protocol to initiate resource reservation for links in the forwarding construct. Resources may be reserved on a link-by-link basis, based upon the contents of a protocol object contained in the RSVP-TE Path message. Alternatively, the Master Control Node may use the RSVP-TE protocol to reserve the same bandwidth for all links in the forwarding construct.

The invention may be employed in the case where frames received at an Edge Node, from an external network, are Ethernet frames.

According to a second aspect of the present invention there is provided a node for use in a transport network and configured to route received frames towards Edge Nodes belonging to a set of Edge Nodes on the basis of a label added to the frame at an ingress Edge Node. The node comprises a memory providing a forwarding table comprising an entry or entries mapping frame labels to output forwarding ports such that said entry or entries, together with entries contained within forwarding tables of other nodes of the transport network, form a single forwarding construct such that frames labelled by any of the Edge Nodes of said set are transmitted to all other Edge Nodes of the same set. The node further comprises a processing unit arranged, upon receipt of a frame, to use the provided forwarding table to map the frame label of the frame to one or more forwarding ports, and a sending unit for sending the frame via the identified forwarding port(s).

The node may be configured to handle packets according to the PBB-TE or MPLS protocol.

Where the node is an Edge Node, the node may be configured to operate as a Master Control Node to manage the forwarding construct utilising the RSVP-TE signalling protocol.

DETAILED DESCRIPTION

The following abbreviations are used throughout this document:

| CP | Control Plane |
|---|---|
| GMPLS | Generalized Multi-protocol Label Switching |
| LAN | Local Area Network |
| MCN | Master Control Node |
| MEF | Metro Ethernet Forum |
| MPLS | Multi-protocol Label Switching |
| NHLFE | Next Hop Forwarding Entry |
| PB | Provider Bridge |
| PBB | Provider Backbone Bridging |
| PBB-TE | Provider Backbone Bridging - Traffic Engineering |
| PWE | Pseudo-wire End-to-End |
| RSVP-TE | Resource Reservation Protocol - Traffic Engineering |
| VLAN ID | Virtual Local Area Network Identifier |
| VPLS | Virtual Private LAN Service (RFC-4762) |

As has already been discussed above, in today's transport networks, either duplication of frames at edges or forwarding frames over multiple point-to-point connections is used to achieve broadcasting of customer frames. However, although the use of multicast trees avoids the need for frame duplication, it requires the construction of as many multicast trees as there are edge nodes associated with a particular customer. There is no mechanism that implements the broadcast behavior using only a single connectivity construct. The defined GMPLS control solutions that are based on RSVP-TE ([6][7][8]) consider and therefore support only their specific connectivity constructs. Consequently, there is no RSVP-TE based signaling mechanism defined to establish broadcast connectivity.

Figure 1:
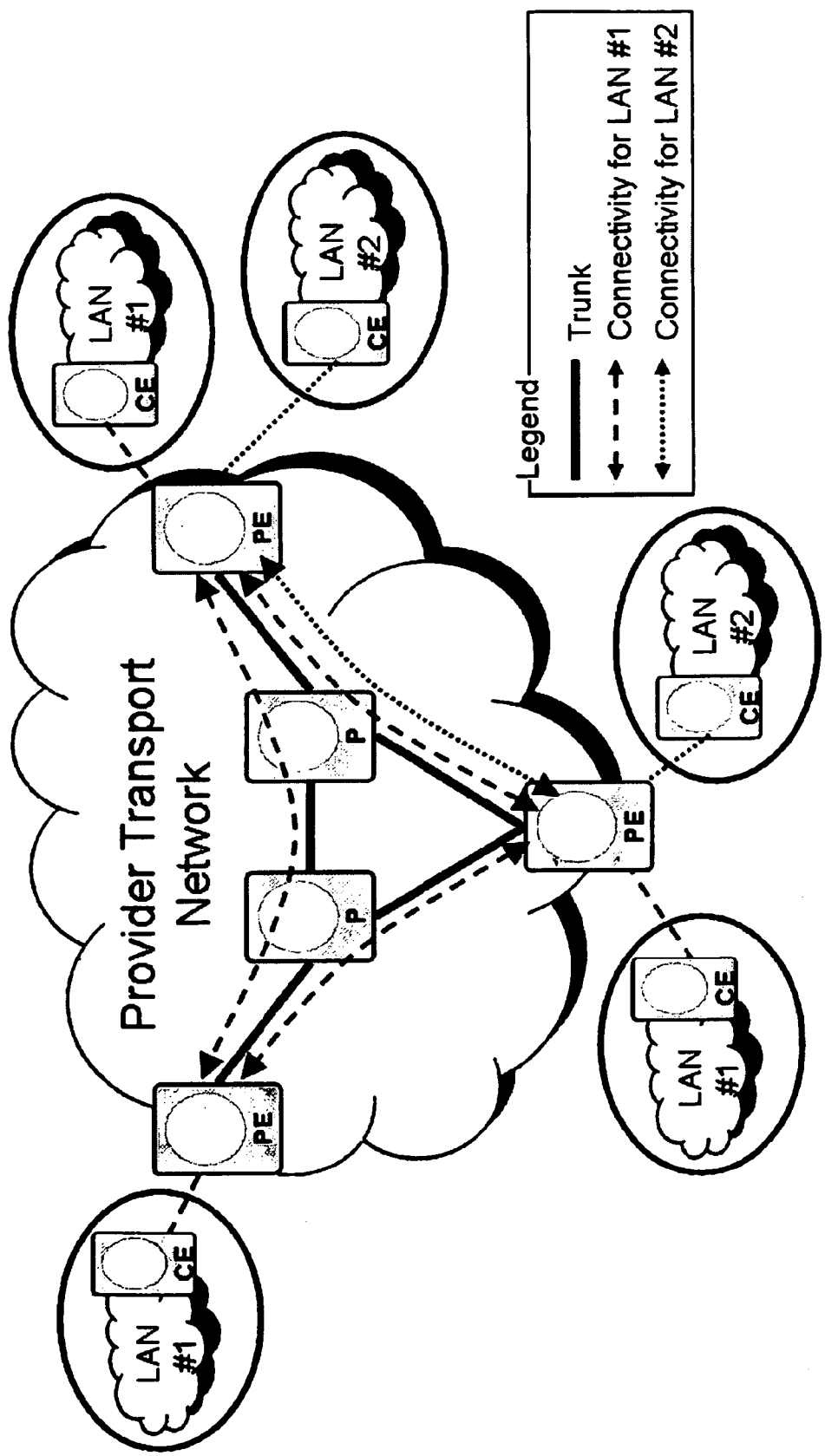
FIG. 1 illustrates schematically a set of Ethernet Local Area Networks interconnected via an operator's transport network.
Figure 2:
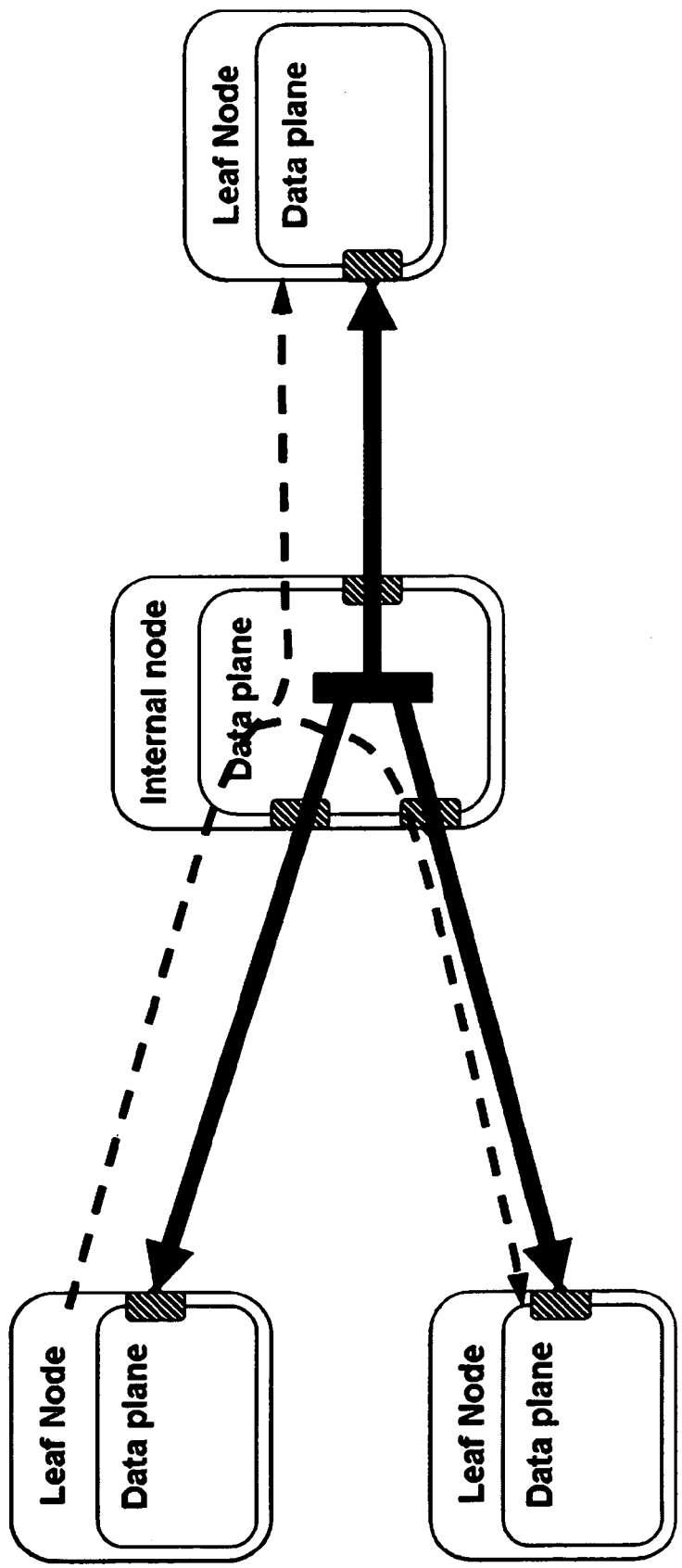
FIG. 2 illustrates schematically a broadcast tree construct that can be implemented in the network architecture of FIG. 1.

A "broadcast tree" is a multipoint connectivity construct between two or more endpoints of a network. The frames sent by any of the endpoints of a broadcast tree will be transmitted to all other endpoint of the same tree. Rather than considering the broadcast tree as a set on n multicast trees, it is proposed here to use one forwarding construct for the broadcast tree. This is illustrated schematically in FIG. 2, which illustrates a simplified transport network architecture comprising three Edge (or leaf) Nodes, and a single intermediate node. The broadcast construct exists in the data plane and is illustrated by the thick line. The dashed line illustrates the frame forwarding path taken by a frame sent out by the Edge Node shown at the upper left side of the figure.

In the case of PBB-TE, Ethernet frames are relayed across the transport network based on the destination Backbone MAC address (B-MAC) and the Backbone VLAN (B-VLAN) identifier. PBB-TE implements standard Ethernet behaviour in so far as nodes learn mappings between GMAC and B-VLAN pairs and ports by examining incoming packets. That is, when a frame is received at in ingress port of a node, the node maps the source B-MAC and B-VLAN pair of the frame to the ingress port identity, and places this mapping into its forwarding table (referred to as a "filtering" table in the PBB-TE standard documents). When a node subsequently receives a frame containing that same B-MAC and B-VLAN pair as destination label, the node is able to determine the appropriate egress port by inspecting the forwarding table.

Figure 3:
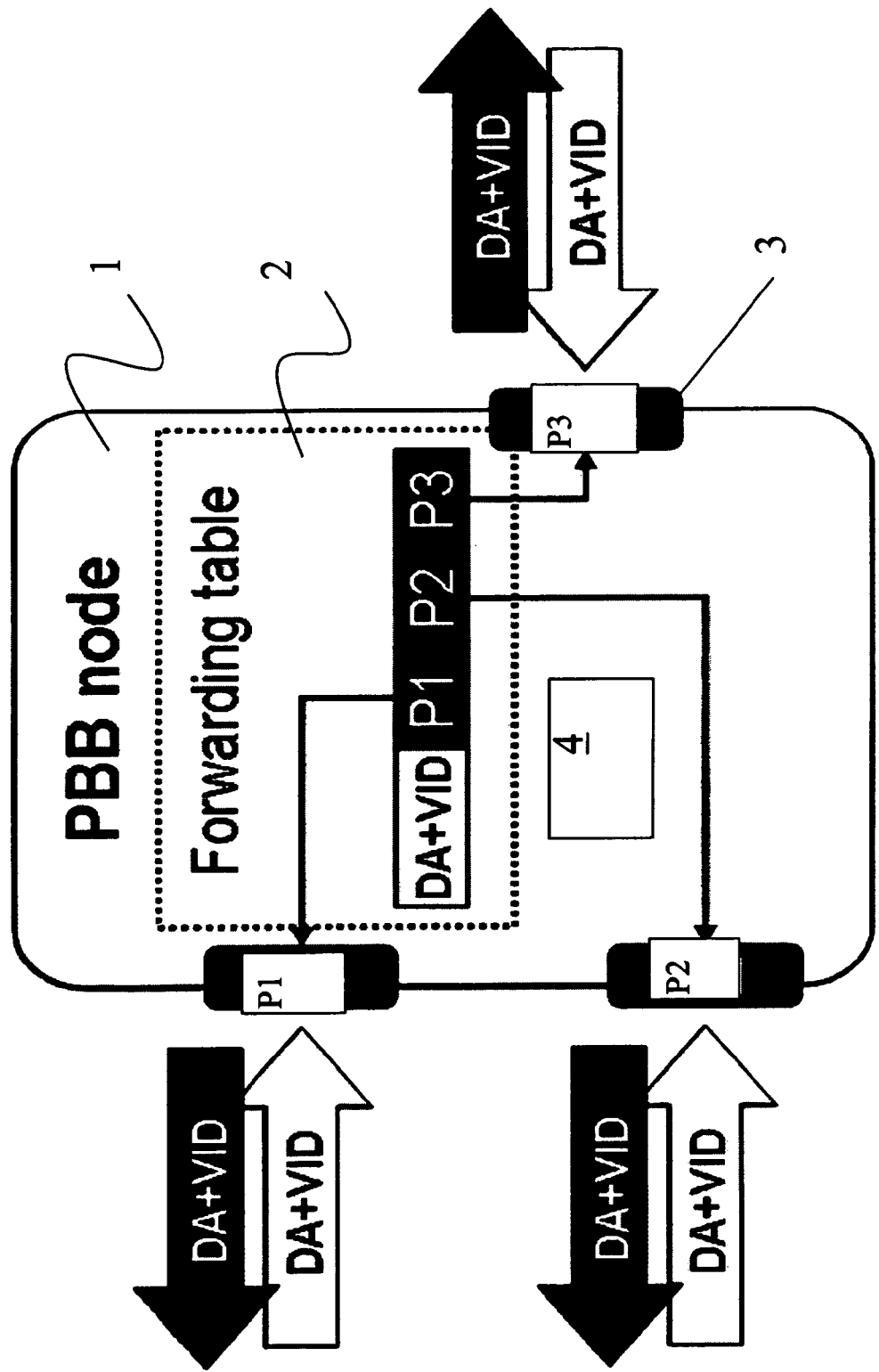
FIG. 3 illustrates schematically a PBB network node configured with a forwarding table forming part of a broadcast tree construct.

Again, according to standard Ethernet behaviour, when a PBB-TE node receives a frame having a destination GMAC and B-VLAN pair which cannot be found in the forwarding table, the node must copy and send the frame through all egress ports of that node that are assigned to the B-MAC and B-VLAN pair according to the broadcast tree structure. PBB-TE implements standard Ethernet behaviour in so far as the ingress port over which the frame is received is excluded from the forwarding operation if it was also listed as an outgoing port. This feature makes it possible to create the data plane forwarding configuration illustrated in FIG. 3 (where DA is the B-DMAC and VID is the B-VLAN ID). FIG. 3 shows the PBB node 1, comprising a memory 2 storing the forwarding table, three ingress/egress ports (P1,P2,P3) one of which is identified by reference numeral 3, and a processing unit 4 that identifies the forwarding ports for a received frame by examining the forwarding table.

To configure the tree it is enough to create one common forwarding entry within the forwarding table of a PBB node and in which all ports belonging to the tree instance are enumerated. The same label is used at each port and a single forwarding entry defines all three ports as outgoing ports.

Due to their role in the forwarding process, in the GMPLS control for PBB-TE, the labels are defined as the concatenation of the pair of the B-MAC and B-VLAN ID. The above operation introduces restriction on the available labels as will be described below.

Considering now an MPLS-based network, forwarding in the data plane at an MPLS node is carried out using so-called Next Hop Label Forwarding Entries (NHLFEs). The incoming ports are bound to label spaces and per label space Incoming Label Mapping (ILM) tables are defined. The NHLFEs are triggered through a label lookup process within the node. The ILMs describes what NHLFE must be triggered upon receipt of a frame with a certain label value [9].

According to MPLS, a label is a 20 bit value (from 15 to ~1000000). A label space defines the scope of the labels (i.e. a label space within a given node consists of one or more ports of that node). A label must be unique in a label space but it can be re-used in different label spaces. The elements of an NHLFE are selected based on the combination of the label space and the label value. One or more interfaces in a Label Switch Router (LSR) can be assigned to a certain label space. Both per-interface label spaces and per-node (per-platform) label spaces (when all ports of a LSR are in the same label space) can be defined.

Figure 4:
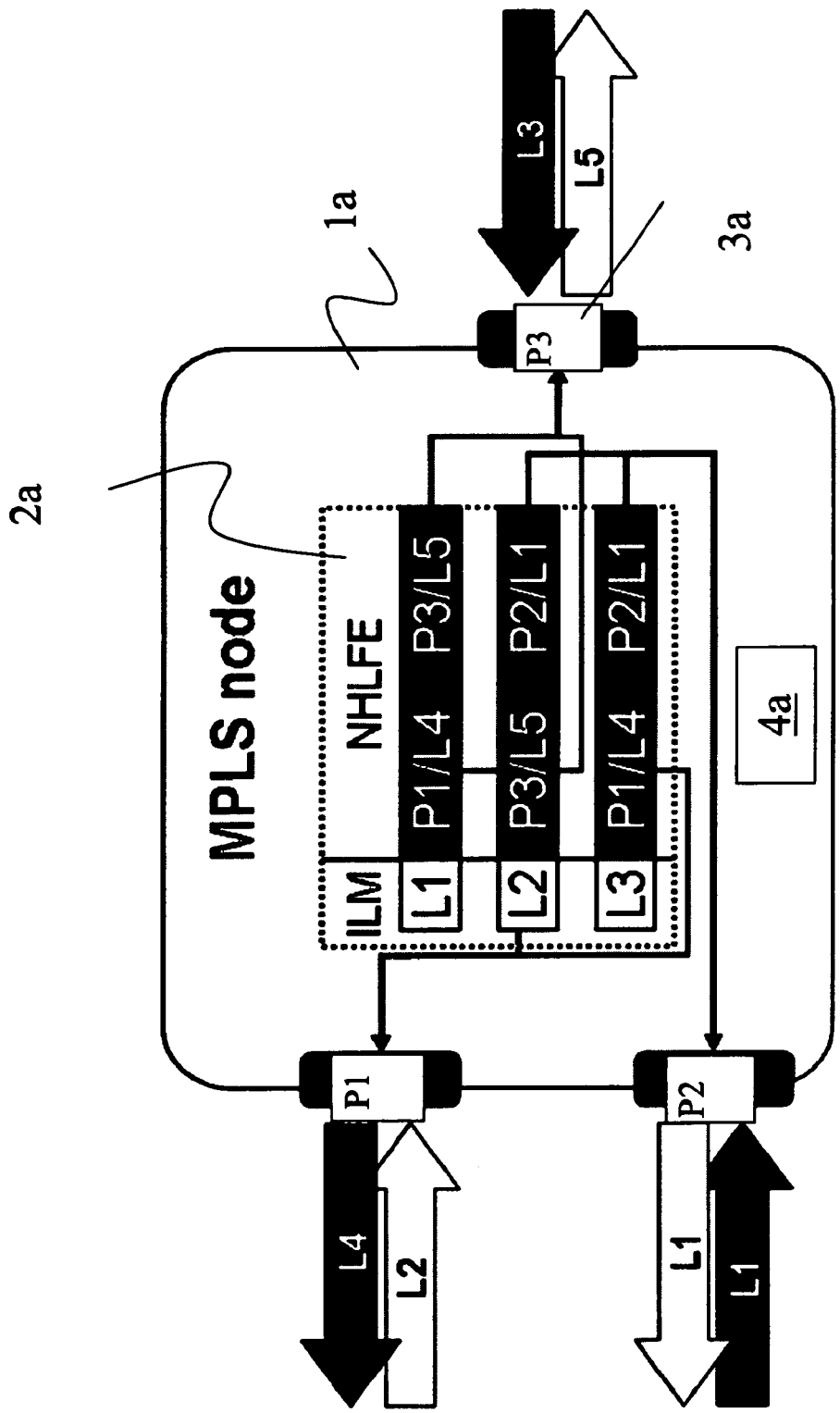
FIG. 4 illustrates schematically an MPLS network node configured with a forwarding table forming part of a broadcast tree construct.

In the case of MPLS multicast, frames will be sent out on all ports that are enumerated in the NHLFE. If the incoming port is enumerated in the triggered NHLFE, a copy of the frame will be sent backwards, in the upstream direction. To avoid this effect, a separate NHLFE must be defined for each incoming port of the broadcast tree, with the NHLFE listing all broadcast tree ports except the incoming port. This is illustrated in FIG. 4 where reference numerals for features common to the node of FIG. 3 are reused, with the suffix "a".

As label values can be changed, different label values can be accepted at different ports. For each broadcast tree, one forwarding entry is defined per incoming port and, for each forwarding entry, all ports excluding the incoming one are enumerated. Of course, it must be ensured that the NHLFEs are addressed unambiguously. Thus, for ports belonging to the same label space, different incoming labels must be specified. This restriction must be taken into account when the label selection procedures are implemented.

Figure 5:
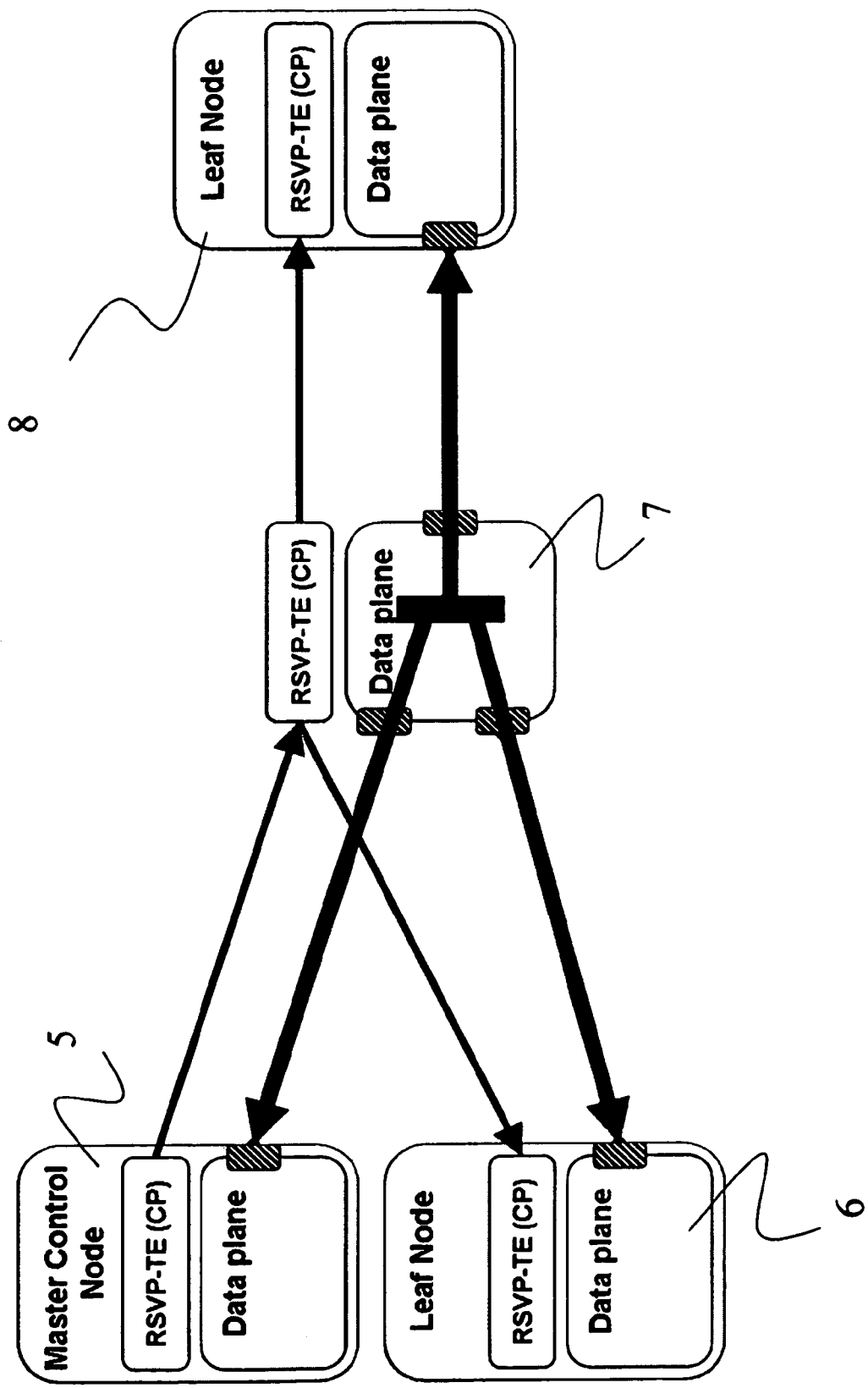
FIG. 5 illustrates schematically a control and data plane split within a transport network, with one of the leaf nodes acting as a Master Control Node.

Considering both PBB-TE and MPLS, broadcast tree connectivity is symmetrical in the data plane, i.e., all endpoints are able to send traffic to all other endpoints within the tree. To efficiently manage a broadcast tree, one of the endpoints is designated to generate the signaling messages (RSVP-TE) in the GMPLS control plane. This endpoint is referred to here as the "Master Control Node" (MCN), while the other endpoints are referred to as "Leaf Nodes". Using appropriate signaling, the MCN is able to manage (e.g. establish, remove, extend, prune etc.) the tree as illustrated in FIG. 5, where nodes 5, 6, and 8 are Edge Nodes of which node 5 is the MCN, and node 7 is an intermediate node. More particularly, the MCN reuses the MPLS signaling framework specified for multicast trees (RFC-4875) [7]. Although the connection is symmetric in the data plane, based upon the directions of the communication of RSVP-TE signaling the port can be either upstream or downstream. The PATH messages are received through the upstream ports and forwarded through the downstream ports.

Two alternative signaling schemes for establishing broadcast trees will now be described. A first approach involves an explicit identification of the broadcast tree and is applicable to both MPLS and PBB-TE, whilst a second approach relies upon an implicit description and is applicable only to PBB-TE.

A new, explicit signaling construct may be defined for RSVP-TE for the purpose of establishing a broadcast tree. This construct defines new Session, Sender Template and the Filter Spec objects. As the broadcast tree provides symmetrical connection between the leaves of the tree, the Upstream Label [6] is a mandatory object. Considering the construct in detail:

Session Object

The format of the Session object is the same as defined in RFC-4875.

Sender Template Object

Figure 6:
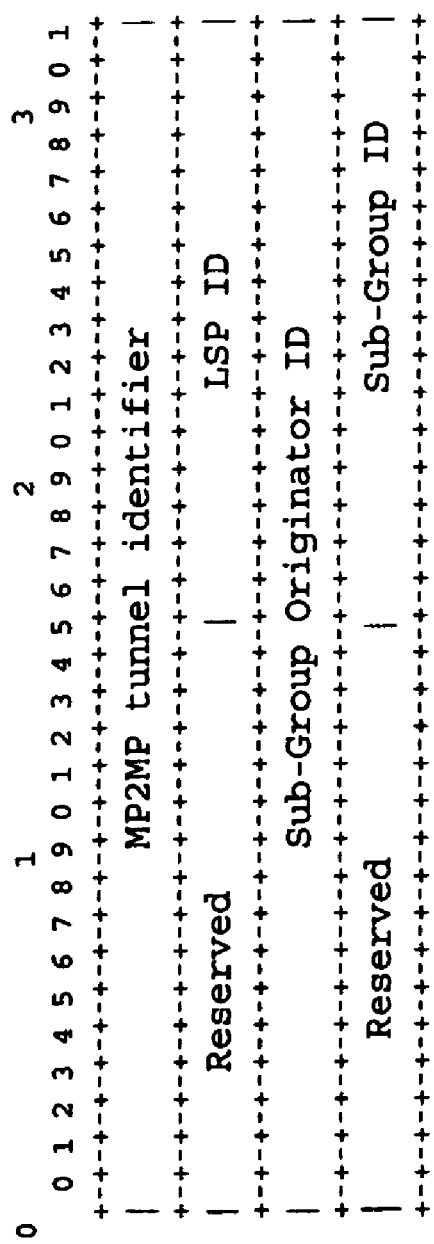
FIG. 6 shows a proposed sender template object for broadcast trees, according to the GMPLS protocol.

A new format of the Sender Template object is shown in FIG. 6. In this Sender Template object, instead of an IPv4/IPv6 tunnel sender address field, a new field is introduced: namely MP2MP ID. The broadcast tree is identified by the combination of the P2MP ID of SESSION and the new MP2MP ID of the SENDER_TEMPLATE objects. The MP2MP ID is valid within the scope of a session. At the same time, fields proposed by RFC-4875 are adopted.

If changing of the MCN during the lifetime of a tree is supported, the MP2MP ID must be set to a value that is known by all endpoints that can potentially act as MCN. Otherwise, the MP2MP ID can be set to the IP address of the MCN.

In the case of IPv4 signaling, the MP2MP tunnel identifier is 32 bits in length, whereas in the case of IPv6 it is 128 bits. In the default case, the MP2MP tunnel identifier is the IP address (either IPv4 or IPv6) of the MCN.

Upstream Label Object

The format of the Upstream Label object is as previously defined [6].

A second, implicit approach to identifying a broadcast tree will now be discussed. As has already been described, in the case of PBB-TE, forwarding is carried out based upon the frame label, which is the concatenation of the Destination B-MAC address and a B-VLAN identifier. When a multicast tree is constructed, all of the downstream ports are bound to the same forwarding entry. Binding the upstream port to the forwarding entry will result in a broadcast tree. This configuration can be achieved simply by enforcing label selection: the same label should be selected in both downstream and upstream directions. RSVP-TE signaling provides a means to achieve this: the label in the upstream direction is defined by the Upstream Label object [6], while in the downstream direction the labels available to the egresses are restricted using the Label Set object [6].

Implicit definition (label value based) of the broadcast tree exploits this operation. The RFC-4875 signaling framework is used without any extensions, but the ingress node explicitly defines both the upstream and downstream labels. However, the implicit declaration limits the applicability of the signaling to PBB-TE and blurs the difference between signaling multicast and broadcast tree. Furthermore, the explicit definition results in a more general solution for PBB-TE.

Regardless of whether an explicit or implicit mechanism is used to identify the broadcast tree, the MCN maintains the control plane of the broadcast tree and records a full description of the broadcast tree. In the defined signaling solutions, no communication occurs between the leaves, only between the leaves and the MCN. Moreover, only the MCN plays an active role in managing the tree. Thus, storing the whole description of the tree at the MCN is sufficient, although some Leaf Nodes may store a copy of the Control Plane (CP) state for recovery purpose. [The CP state contains all necessary information to control a broadcast tree entity. Its content is signalled with RSVP-TE.]

In a broadcast tree, more than one end node can generate multicast traffic at the same time. Therefore, the amount of resources to be reserved at the intermediate tree links must be carefully calculated. [Note that it is assumed here that the same amount of resources are allocated in both directions over such an intermediate tree link.] If the topology of the tree is known, the amount of bandwidth to be reserved on a certain link can be determined, since each link in the tree splits the set of end nodes into two distinct sets. However, the intermediate nodes have no information about all of the branches and all of the end nodes. Therefore, only the MCN or a path calculation entity has knowledge of the whole tree. Thus, the MCN or the path calculation entity has the ability to calculate the bandwidth allocated over a certain tree link. Here, two alternative bandwidth allocation/calculation schemes are considered.

A first alternative allows for the allocation of different amounts of resources over different tree links. To signal a per link resource reservation, a new sub-object (using the same format as TSPEC [6]) is added to the ERO and SERO objects (RFC-4875) in the Path message. This new object carries the amount bandwidth to be allocated over the link identified by the ERO (or by SERO) element. The amount of allocated bandwidth on a certain link will be signaled back in the RESV message as defined by the RFCs. The amount of reserved resources might be changed hop-by-hop in the RESV message.

A second alternative is to allocate the same amount of bandwidth over every broadcast tree link. GMPLS signaling without any further extensions support this scenario. In this case of course, some links may be over-provisioned.

Regardless of the allocation schemes, when the resources to be allocated are being determined, the amount of traffic flowing between the leaves must be taken into account, since there is no direct signaling between the leaves. Because of the centralized path calculation, which is done by either the MCN or by a path computation entity, the discussed signaling solution is enough to appropriately reserve the resources. However, if the shape of the tree is not fully specified (e.g., there is no ERO/SERO object for some of the S2L LSPs), the first alternative cannot be applied.

Updating of the local procedures and signaling to allow configuration of the broadcast tree connectivity over two specific data planes, namely the PBB-TE and the MPLS, will now be considered.

The major difference between the broadcast and the multicast trees is the configuration of the forwarding entries and thus the selection of the labels. Therefore, here we focus on the label selection procedures.

Both the explicit and the implicit definition based alternatives can be used to signal a broadcast tree in a PBB-TE network. At the MCN, a common label is created by selecting a multicast B-MAC address and a B-VLAN ID pair. The LABEL_SET object will contain this label value as a single value and the Label type is set to inclusive list. Furthermore, the UPSTREAM_LABEL object will also carry this label value.

To ensure unambiguous forwarding, all paths and trees in a PBB-TE domain must use different labels. In a broadcast tree, the label contains a VLAN ID and a multicast MAC address. Since the multicast MAC addresses are dynamically assigned, it is possible to split the available multicast MAC addresses into subsets, with each subset being exclusively assigned to an Edge Node. In this way, the different MCNs will select different labels.

At the intermediate nodes, the downstream interfaces will be configured according to the LABEL_SET object, while the upstream interface is set based on the UPSTREAM_LABEL. Due to use of the same label in the upstream and downstream directions, the desired broadcast tree will be configured at all intermediate nodes.

Only the explicit declaration based alternative can be used in the MPLS data plane. The NEN node specifies the UPSTREAM_LABEL to specify the label used in the upstream direction. The downstream label is selected by the downstream neighbour node, but using the LABEL_SET object the MCN can influence the label selection, if necessary.

The branching nodes must enforce label selection to fulfill the requirements defined above. The following rules for the label selection procedure are defined:

A received PATH message includes the upstream label defining the label towards the MCN. It is sufficient to perform a Label availability check; no other processes are required.

A branching node (as well as other intermediate nodes) defines the upstream labels that are used between the considered node and the downstream neighbours. Different upstream labels must be defined for the downstream ports using the same label space.

When a RESV message received from a downstream neighbour, the NHFLE entries are configured according to the label values. No specific rules exist here.

When the actual branching node passes the RESV message towards an upstream neighbour, the branching node selects a downstream label that must be different from the upstream labels signaled downstream through ports that are in the same label space as the upstream port.

Figure 7:
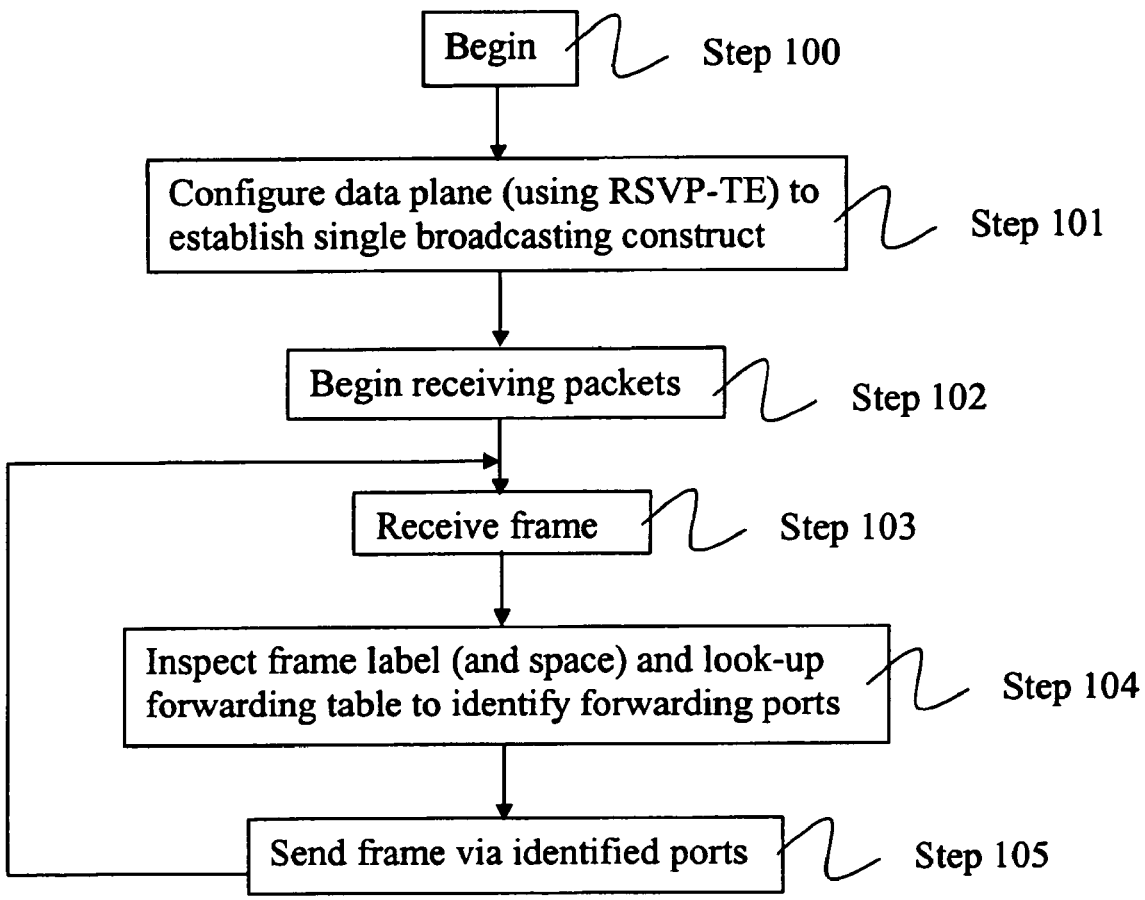
FIG. 7 illustrates schematically a node of a transport network including components for implementing Ethernet-like frame broadcasting.

FIG. 7 is a flow diagram illustrating the overall procedure for handling frame broadcast emulation within a transport network. The procedure begins at step 100. At step 101, the broadcast construct is established using RSVP-TE. In particular, appropriate entries are created in the forwarding tables at the involved nodes. Frames are received at steps 102 and 103. At step 104, for a given frame, the frame label (and label space in the case of MPLS) is inspected and used to look-up the appropriate entity in the forwarding table. At step 105 the frame is duplicated if necessary and sent via the identified forwarding port or ports.

The approaches described above present novel connectivity types for MPLS and PBB to achieve the resource efficient support of Ethernet LAN services. By utilising broadcast trees, the need for frame replication at an ingress node can be eliminated. By avoiding the need for multiple multicast trees, the configuration and management of the LAN service instance is simplified. However, the proposed broadcast tree is configured based on the already existing multicast forward mechanisms in the case of the MPLS and PBB-TE data planes.

It will be appreciated by the person of skill in the art that various modifications may be made to the above described embodiment without departing from the scope of the present invention.

[1] M. Lasserre, V. Kompella, "Virtual Private LAN Service (VPLS) Using Label Distribution Protocol (LDP) Signaling", *IETF/L2VPN RFC*-4762.

[2] R. Aggarwal, Y. Kamite, L. Fang, "Multicast in VPLS" *IETF/L2VPN WG draft* http://www.ietf.org/internet-drafts/draft-ietf-l2vpn-vpls-mcast-03.txt
[3] "IEEE 802.1 Qad, Standard for Provider Bridging"
[4] "IEEE 802.1Qah Draft Standard for Provider Backbone Bridging", work in progress.
[5] "IEEE 802.1Qay Draft Standard for Provider Backbone Bridging Traffic Engineering", work in progress.
[6] L. Berger, "Generalized Multi-Protocol Label Switching (GMPLS) Signaling Resource ReserVation Protocol-Traffic Engineering (RSVP-TE) Extensions", *IETF/MPLS RFC*-3473.
[7] R. Aggarwal, D. Papadimitriou, S. Yasukawa, "Extensions to Resource Reservation Protocol-Traffic Engineering (RSVP-TE) for Point-to-Multipoint TE Label Switched Paths (LSPs)", *IETF/CCAMP RFC*-4875.
[8] S. Yasukawa, "Supporting Multipoint-to-Point Label Switched Paths in Multiprotocol Label Switching Traffic Engineering" *IETF/MPLS individual draft*, http://tools.ietf.org/html/draft-yasukawa-mpls-mp2p-rsvpte-03
[9] E. Rosen, A. Viswanathan and R. Callon, "Multiprotocol Label Switching Architecture", *IETF/MPLS RFC*-3031.

The invention claimed is:

1. A method to facilitate the broadcast of frames between a set of Edge Nodes of a transport network, wherein nodes of the transport network forward frames using labels added to the frames at ingress Edge Nodes, the method comprising the steps of:
designating one of said Edge Nodes to manage a forwarding construct for the broadcast tree within the transport network using control plane RSBP-TE signalling acting as a master control node;
signalling from the designated Edge Node to each of said other Edge Nodes, and to intermediate nodes in the paths between said Edge Nodes, to install an entry or entries into a forwarding table of the Edge and intermediate nodes mapping frame labels to output forwarding ports such that said entries together form a single forwarding construct for the broadcast tree such that frames labeled by any of the Edge Nodes of said set are transmitted to all other Edge Nodes of the same set;
upon receipt of a frame at one of said Edge Nodes or intermediate nodes, using the provided forwarding table to map the frame label of the frame to one or more forwarding ports; and,
sending the frame via the identified forwarding port(s).

2. The method according to claim 1, wherein said single forwarding construct for the broadcast tree is defined for PBS-TE and said an entry in a forwarding table contains the identities of all ports of a node that transport frames to the Edge Nodes of the forwarding construct.

3. The method according to claim 2, the method comprising installing a single forwarding entry mapping a Backbone MAC address and Backbone VLAN identifier to the identities of all output ports in the forwarding paths between Edge Nodes and Intermediate nodes.

4. The method according to claim 1, wherein the single forwarding construct for the broadcast tree is defined for MPLS and the forwarding construct is implemented as a set of entries in the Incoming Label Mapping table and the Next Hop Label Forwarding Entry table of each node, with one entry being defined in each table for each port of the node transporting frames to the Edge Nodes of the forwarding construct, and each entry containing the identities of all ports of the node that transport frames to the Edge Nodes of the forwarding construct except the port to which the entry is assigned.

5. The method according to claim 1, wherein said designated Edge Node manages the single forwarding construct for the broadcast tree utilising the RSVP-TE signaling protocol.

6. The method according to claim 5, wherein the designated Edge Node uses the RSVP-TE protocol to initiate resource reservation for links in the single forwarding construct for the broadcast tree.

7. The method according to claim 6, wherein resources are reserved on a link-by-link basis based upon the contents of a protocol object contained in the RSVP-TE path message.

8. The method according to claim 6, wherein the designated Edge Node uses the RSVP-TE protocol to reserve the same bandwidth for all links in the single forwarding construct for the broadcast tree.

9. The method according to claim 1, wherein the frames received at an Edge Node, from an external network, are Ethernet frames.

10. An Edge node for use in a transport network and configured to route received frames towards Edge Nodes belonging to a set of Edge Nodes on the basis of a label added to the frame at an Ingress Edge Node, the node comprising:
a memory providing a forwarding table comprising an entry or entries mapping frame labels to output forwarding ports, such that said entry or entries, together with entries contained within forwarding tables of other nodes of the transport network, form a single forwarding construct for the broadcast tree such that frames labeled by any of the Edge Nodes of said set are transmitted to all other Edge Nodes of the same set;
a processing unit arranged, upon receipt of a frame, to use the provided forwarding table to map the frame label of the frame to one or more forwarding ports; and
a sending unit for sending the frame via the identified forwarding port(s), wherein the Edge node is configured to operate as a Master Control Node to manage the single forwarding construct or the broadcast tree by signaling to other Edge and intermediate nodes of the transport network utilising the RSVP-TE signaling protocol.

11. The node according to claim 10, wherein the node is configured to handle packets according to the PBB-TE protocol.

12. The node according to claim 10, wherein the node is configured to handle packets according to the MPLS protocol.

* * * * *

UNITED STATES PATENT AND TRADEMARK OFFICE
CERTIFICATE OF CORRECTION

| | | |
|---|---|---|
| PATENT NO. | : 8,385,341 B2 | Page 1 of 1 |
| APPLICATION NO. | : 13/122508 | |
| DATED | : February 26, 2013 | |
| INVENTOR(S) | : Kern et al. | |

It is certified that error appears in the above-identified patent and that said Letters Patent is hereby corrected as shown below:

In the Specifications

In Column 4, Line 47, delete "GMAC" and insert -- B-MAC --, therefor.

In Column 4, Line 58, delete "GMAC" and insert -- B-MAC --, therefor.

In Column 8, Line 14, delete "NEN" and insert -- MCN --, therefor.

In the Claims

In Column 10, Line 43, in Claim 10, delete "ports; and" and insert -- ports; and, --, therefor.

Signed and Sealed this
Sixth Day of August, 2013

Teresa Stanek Rea
*Acting Director of the United States Patent and Trademark Office*